US009146936B2

(12) United States Patent
Roka

(10) Patent No.: US 9,146,936 B2
(45) Date of Patent: Sep. 29, 2015

(54) SYSTEMS AND METHODS FOR AUTOMATICALLY SYNCHRONIZING DATA USING A MOBILE COMMUNICATIONS DEVICE

(75) Inventor: Pujan K. Roka, Atlanta, GA (US)

(73) Assignee: Cox Communications, Inc., Atlanta, GA (US)

( * ) Notice: Subject to any disclaimer, the term of this patent is extended or adjusted under 35 U.S.C. 154(b) by 839 days.

(21) Appl. No.: 13/012,551

(22) Filed: Jan. 24, 2011

(65) Prior Publication Data
US 2012/0188996 A1 Jul. 26, 2012

(51) Int. Cl.
H04J 3/00 (2006.01)
G06F 17/30 (2006.01)

(52) U.S. Cl.
CPC .................. *G06F 17/30174* (2013.01)

(58) Field of Classification Search
CPC .................................................. G06F 17/30174
USPC ........................................................ 370/350
See application file for complete search history.

(56) References Cited

U.S. PATENT DOCUMENTS

| 6,477,543 | B1 | 11/2002 | Huang et al. |
| 7,590,629 | B2 | 9/2009 | Sahinoja et al. |
| 2005/0100113 | A1* | 5/2005 | Corts et al. ...................... 375/295 |
| 2006/0041893 | A1 | 2/2006 | Castro et al. |
| 2006/0178133 | A1 | 8/2006 | Kim |
| 2006/0223553 | A1* | 10/2006 | Reisgies ........................ 455/466 |
| 2007/0255785 | A1* | 11/2007 | Hayashi et al. ................ 709/204 |
| 2008/0005280 | A1* | 1/2008 | Adams ........................... 709/219 |
| 2008/0189718 | A1* | 8/2008 | Gulley et al. .................. 718/107 |
| 2009/0037287 | A1* | 2/2009 | Baitalmal et al. ............... 705/26 |
| 2009/0167553 | A1 | 7/2009 | Hong et al. |
| 2010/0144314 | A1* | 6/2010 | Sherkin et al. ................ 455/411 |
| 2010/0331033 | A1* | 12/2010 | Kojima ......................... 455/513 |
| 2011/0151837 | A1* | 6/2011 | Winbush, III .............. 455/412.1 |
| 2012/0131116 | A1* | 5/2012 | Tu et al. ........................ 709/206 |
| 2013/0007902 | A1* | 1/2013 | Lurey et al. ..................... 726/30 |

FOREIGN PATENT DOCUMENTS

WO 2006055543 A3 5/2006

* cited by examiner

*Primary Examiner* — Shripal Khajuria
*Assistant Examiner* — Faisal Choudhury
(74) *Attorney, Agent, or Firm* — Sutherland Asbill & Brennan LLP

(57) ABSTRACT

Embodiments of the invention provide systems and methods for automatically synchronizing data using a mobile communications device (MCD). According to one embodiment, a method for automatically synchronizing data using an MCD is provided. The method may include: associating an automatic synchronization command with an event occurrence on an MCD and at least one MCD application; and, upon detecting the event occurrence, executing the automatic synchronization command to cause automatic synchronization of data between memory of the MCD and at least one remote server associated with the MCD application.

19 Claims, 6 Drawing Sheets

SYSTEMS AND METHODS FOR AUTOMATICALLY SYNCHRONIZING DATA USING A MOBILE COMMUNICATIONS DEVICE

FIELD OF THE INVENTION

Aspects of the invention relate generally to mobile communications devices, and more particularly, to systems and methods for automatically synchronizing data using a mobile communications device.

BACKGROUND OF THE INVENTION

Use of mobile communications devices ("MCDs"), such as cellular phones, smart phones, email devices, etc., continues to increase. The number and complexity of available applications for use with these MCDs are also proliferating, such that users expect to use their MCDs to access and fully utilize a variety of applications. More and more of these MCD applications include synchronization operations whereby data is synchronized between the MCDs and remote back-end servers supporting the MCD applications over the wireless network. In some instances, data maintained or entered on an MCD for use with a certain application is synchronized with the remote server supporting that application so the data can be stored, updated, and maintained by other devices and from other locations, and for display via other communications channels. Similarly, some MCD applications allow data to be downloaded to the MCD when in use, such as to be able to display recent updates, status changes, messages, and the like.

Therefore, a need exists for simplified use of MCD applications and for systems and methods that allow for automatically synchronizing data using an MCD.

BRIEF DESCRIPTION OF THE INVENTION

Some or all of the above needs and/or problems may be addressed by certain embodiments of the invention. Embodiments of the invention may include systems and methods for automatically synchronizing data using an MCD. According to one embodiment, a method for automatically synchronizing data using an MCD is provided. The method may include: associating an automatic synchronization command with an event occurrence on an MCD and at least one MCD application; and, upon detecting the event occurrence, executing the automatic synchronization command to cause automatic synchronization of data between memory of the MCD and at least one remote server associated with the MCD application.

According to another embodiment, a computer-readable media for automatically synchronizing data is provided. The computer-readable media may have computer program instructions which when executed by at least one MCD processor cause the at least one MCD processor to: associate an automatic synchronization command with an event occurrence on an MCD and at least one MCD application; and, upon detecting the event occurrence, execute the automatic synchronization command to cause automatic synchronization of data between memory of the MCD and at least one remote server associated with the MCD application.

Additional systems, methods, apparatus, features, and aspects may be realized through the techniques of various embodiments of the invention. Other embodiments and aspects of the invention are described in detail herein with reference to the description and to the drawings and are considered a part of the claimed invention.

BRIEF DESCRIPTION OF THE DRAWINGS

Reference will now be made to the accompanying drawings, which are not necessarily drawn to scale, and wherein.

DETAILED DESCRIPTION

Figure 1:
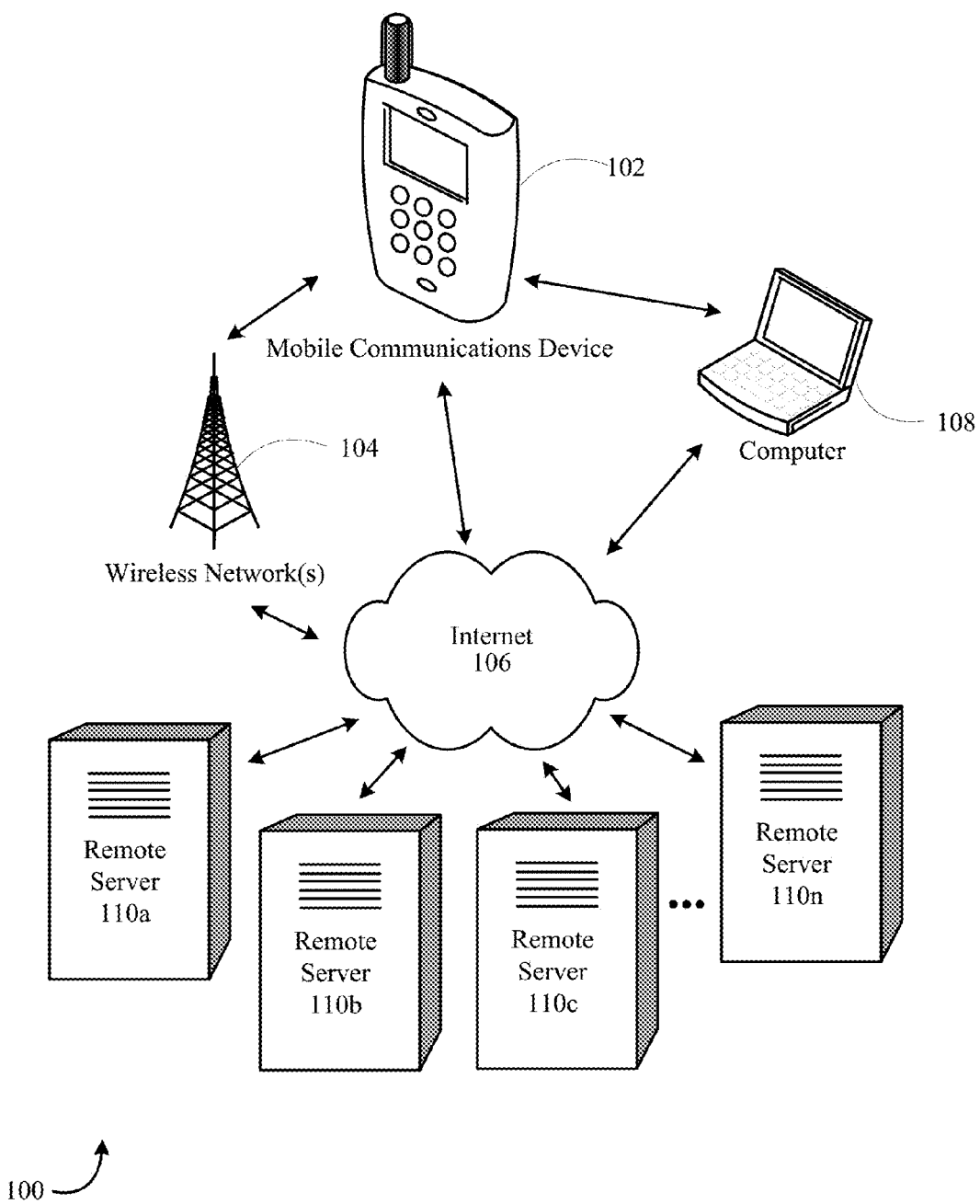
FIG. 1 is an example system, according to an example embodiment of the invention.

Embodiments of the invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Certain embodiments include systems and methods for automatically synchronizing MCD application data using an MCD in response to the user's selection of an input key or other event occurrence. The embodiments described herein provide simplified means to synchronize data, as well as the ability to configure synchronization settings according to a user's preferences and habits. According to one embodiment, programming logic and synchronization configuration settings and mappings can define an automatic synchronization command that can be associated with an MCD event occurrence (e.g., selection of an input or other predetermined function or use of the MCD, etc.) and one or more MCD applications that are to be synchronized. When a user causes the event occurrence (e.g., selects an input, etc.) by using the MCD, the automatic synchronization logic will initiate automatic synchronization by the one or more MCD applications that are associated with that particular event occurrence. Depending upon the MCD application, and optionally any user defined synchronization parameters, synchronization may synchronize data stored in the MCD to one or more remote "back-end" servers associated with the MCD applications being synchronized. The event occurrence may be related to newly generated or data otherwise stored on the MCD, which is to be synchronized with the remote servers. Synchronization may also, or instead, cause synchronization of newly generated data available from the remote servers for importing and storing on the memory of the MCD in association with the MCD application being synchronized. Thus, the embodiments described herein provide a simplified means to automatically synchronize data in response to the user's selection or other input to an MCD.

As discussed, MCDs are currently being utilized for far more than voice or text communications. Many users utilize their MCDs to use software applications and to access web-based or other remote applications. Many MCD applications involve synchronization of data over the wireless network between the MCDs and remote back-end servers supporting the MCD applications. Conventionally, some MCD applications synchronize automatically, in the background, or others synchronize upon invoking the application or periodically while utilizing the application. Yet other MCD applications require specific user input and commands to cause synchronization and currently do not provide a means for automatic synchronization. The embodiments described herein, however, provide programming logic that empowers a user to define when and how MCD applications are synchronized automatically and in response to specific MCD input or other event occurrence. Accordingly, by these embodiments, a user can configure an event occurrence (e.g., a hard key or soft key, etc.) that, when selected or performed, will automatically cause synchronization of data by one or more MCD applications. According to one embodiment, automatic synchronization mappings may be defined by classifying MCD applications (e.g., according to their function, typical operations, data type, etc.) and then mapping an associated event occurrence with the MCD application classification. This process allows synchronization of every MCD application having the same MCD application classification. For example, selection of a camera key on an MCD may cause synchronization of picture files stored on the MCD with one or more MCD applications that utilize pictures (e.g., social networking sites, web-based photograph-sharing applications, etc.). As another example, an MCD input key can be associated with an automatic synchronization command for a particular MCD application in a manner similar to a shortcut key assignment, so that upon selecting of the assigned MCD input key the mapped MCD application will automatically synchronize as configured. Thus, synchronization can occur at the selection of a single key without requiring the user to invoke an application or manually initiate synchronization. The data synchronized may be associated with the event occurrence, such as data that is generated as a result of the event occurrence, operated on as a result of the event occurrence, or otherwise retrieved with the input, function, or application utilized by the event occurrence. In other embodiments, however, the data synchronized may be entirely independent of, or have no clear relevance to, the event occurrence, such as a favorites key which causes automatic synchronization.

As used herein, the terms "MCD" and "mobile communications device" generally refer to any communications device operable for mobile or wireless voice and/or text communication, such as, but not limited to, a cellular or other mobile phone, a smart phone, a pager, a mobile email device, a tablet computer, a digital audio/video player, or any other similar device and/or any combination thereof. The term "MCD application" can refer to any software-based application or function operable for execution by an MCD, which may be operable to interact with one or more remote or back-end servers over a network. Example MCD applications may include, but are not limited to, web-based digital music stores; web-based streaming music sites; web-based file-sharing sites; web-based photograph hosting or storing sites; web-based social network sites (e.g., Facebook.com by Facebook, Inc. of Palo Alto, Calif.; Friendster.com by Friendster, Inc. of Mountain View, Calif.; Myspace.com by News Corp. of Beverly Hills, Calif.; Twitter.com by Twitter, Inc. of San Francisco, Calif.; Foursquare of New York, N.Y.; LinkedIn by LinkedIn Corporation of Mountain View, Calif.; and Flickr by Yahoo!, Inc. of Sunnyvale, Calif., etc.); contact management applications; email applications; web-based retail sites; short message service ("SMS") applications; multimedia messages service ("MMS") applications; bill payment applications; web-based informational sites; image or text-based recognition services; and the like. It is appreciated that the aforementioned list of example MCD applications is provided for illustrative purposes and is not limiting. The embodiments described herein may be utilized with any suitable application executable by an MCD.

More details regarding the various means for implementing the embodiments of the invention are provided below with reference to FIGS. 1-5.

System Overview

An example system 100 will now be described illustratively with respect to FIG. 1. The system 100 may include an MCD 102, which is operable to communicate over one or more wireless networks 104 using any suitable wireless communications protocol (e.g., cellular, Wi-Fi Internet communications, WiMAX network communications, and the like). The MCD 102 may be associated with a wireless network operator (not shown) as a subscriber of wireless communications services provided by the wireless network operator. According to some embodiments, the wireless network operator may be utilized to facilitate, in part, automatic synchronization between an MCD 102 and a remote server, such as to monitor data transmission, allow opting in or opting out of data synchronization services, and/or request confirmation of synchronization communications. The wireless network 104 may be any wireless network operable for wireless communications operating under any cellular or other wireless network protocol (e.g., GSM, CDMA, TDMA, etc.). In addition, the wireless network 104 may provide wireless access by MCDs 102 to the Internet 106 (or any other public or private network, which may be wired or wireless), for example, to access the world wide web or to utilize HTTP communications sessions, such as when retrieving MMS messages and/or mobile emails.

Figure 2:
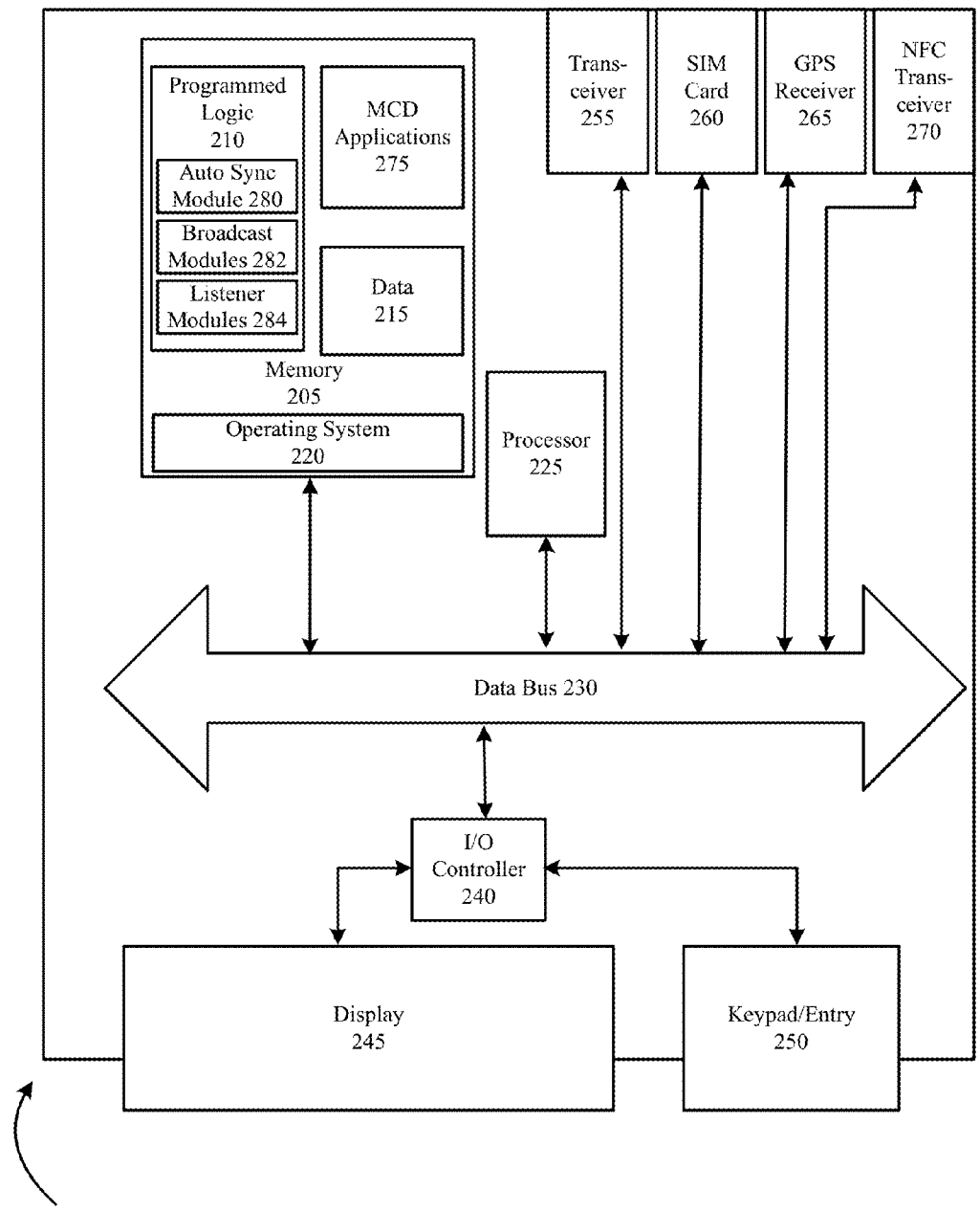
FIG. 2 is a schematic diagram of an example mobile communications device, according to an example embodiment of the invention.

FIG. 2 illustrates a schematic view of an example MCD 102, according to one embodiment. Each MCD 102 includes a memory 205, a processor 225, a transceiver 255, a Subscriber Identity Module ("SIM") card and slot 260 (or any other means to uniquely store and identify the user/subscriber of the MCD), a global positioning system ("GPS") receiver 265, and a near field communications ("NFC") transceiver 270, each in communication over one or more data communications buses 230. The memory 205 may be any suitable memory device, for example, caches, read-only memory devices, random access memory devices, magnetic storage devices, removable storage devices, etc., and may be operable to store programmed logic 210, data 215, one or more MCD applications 275, and an operating system 220. Some MCDs 102 may include multiple memory components, including a built-in memory and a removable storage device. According to one example, the programmed logic 210 may include various programming logic modules configured to facilitate automatic MCD application data synchronization by issuing automatic synchronization commands, as described in more detail herein. For example, according to one embodiment, the programmed logic 210 may include an automatic synchronization module 280, at least one broadcast module 282, and at least one listener module 284; though, in other embodiments, the programmed logic 210 may differ from that described, such as by including any combination or variation of these modules.

An automatic synchronization module 280 may be configured to provide programming logic to facilitate configuring and implementing automatic synchronization of MCD application data in response to the detection of an event occurrence. More specifically, the automatic synchronization module 280 may be configured to: present user interfaces on one or more displays 245 of the MCD 102 for receiving configuration and synchronization parameter input (e.g., mappings, synchronization preferences, usernames, passwords, account information, etc.); store synchronization mappings and parameters for recall during automatic synchronization operations; and facilitate the operation of individual programming modules configured to detect event occurrences (e.g., broadcast modules 282) and to initiate synchronization (e.g., listener modules 284). More details of the operations and configuration of an automatic synchronization module 280 are described by example with reference to FIGS. 3A-5.

Broadcast modules 282 may be configured to provide programming logic that is associated with one or more event occurrences to allow detecting an event occurrence and generating a broadcast trigger or other programming event or command in response thereto. According to one embodiment, a single broadcast module 282 may be configured to monitor and detect each of the event occurrences that have been configured to initiate automatic synchronization. According to another embodiment, however, a separate broadcast module 282 may be provided for each event occurrence, such that multiple broadcast modules 282 are provided if multiple event occurrences are to be monitored. According to certain embodiments, a broadcast module 282 may be configured for execution by the operating system 220 of the MCD 102 to detect the associated event occurrence or occurrences and to generate a broadcast trigger or other event that calls a specific listener module or modules 284 or otherwise generates an event detectable by a listener module or modules 284. One example embodiment may utilize a uniform resource identifier ("URI") convention to identify the event occurrences and to generate the corresponding broadcast triggers or other events to trigger corresponding listener modules 284. According to various embodiments, broadcast modules 282 may be programmed and provided by a mobile device manufacturer and/or by a third-party provider, such as a service provider providing the automatic synchronization functionality for specific MCD 102 types and/or operating specific operating systems 220.

Listener modules 284 may likewise be configured to provide programming logic that is associated with one or more MCD applications 275 to be synchronized and configured to issue an automatic synchronization command that initiates a synchronization operation by the respective MCD application 275 in response to an MCD event occurrence. According to one embodiment, a separate listener module 284 is provided for each MCD application 275 to be synchronized. According to another embodiment, however, a single listener module 284 may be configured to initiate synchronization operations for multiple MCD applications 275. According to one embodiment, the listener modules 284 may be programmed by the MCD application 275 provider, to provide a standardized routine or interface (e.g., an application programming interface ("API")) that can be called by an associated broadcast module 282. In another embodiment, the listener modules 284 can be stand-alone modules operable to call an open interface of the corresponding MCD application 275. For example, the listener modules 284 may be programmed and provided by a mobile device manufacturer and/or by a third-party provider, such as a service provider providing the automatic synchronization functionality and providing specific modules or add-ons that synchronize with certain MCD applications 275.

The processor 225 (or processors) may be operable to execute the programmed logic 210 and the operating system 220, and may be any microprocessor, microcontroller, or any other processing device. The programmed logic 210 may also include conventional programming instructions to perform incoming voice and data transmissions, outbound data and voice transmissions, to generate and display user interfaces and associated data, to generate user notifications, to receive instructions and commands from a user, and the like, as is generally performed by a conventional MCD 102. The transceiver 255 is operable for receiving and transmitting wireless signals, such as may be used for carrying voice and/or data (e.g., voice calls, wireless network communications, SMS messages, MMS messages, mobile email, etc.). Example wireless transceivers 255 include, but are not limited to, radio frequency transceivers, IEEE 802.11-type (also referred to as Wi-Fi), Bluetooth, infrared, and the like. The GPS receiver 265 is in communication with the data communications bus 230 and operable to receive GPS signals from GPS satellite transmitters and communicate the same for operation by the programmed logic 210 for analyzing and utilizing GPS position data. The NFC transceiver 270 is operable for receiving and transmitting NFC communications, such as, but not limited to, communications according to the ISO/IEC 14443 standard, or other short-range communications. The NFC transceiver 270 may be utilized by the MCD 102 to detect location context or retrieve product identifiers (e.g., product SKUs, or other identifiers, etc.). In addition, an input/output ("I/O") controller 240 is operable to facilitate control of input and output to and from the user, via the display 245 and the keypad entry 250, and, optionally, via other interface devices. The I/O controller 240 can thus be implemented in hardware, software, firmware, or any other combination thereof, and may include interface drivers, buffers, or interrupts to handle the input and output of audio, video, data, graphics, etc. The display 245 may be any display for displaying graphics, video, text, etc., on the MCD 102, such as, but not limited to, the screen (e.g., LCD), touch screen, monitor, and/or other display. The keypad/entry 250 component may be any input device, such as, but not limited to, conventional phone-type keypad (e.g., 0-9 plus characters), QWERTY keypad, touch screen interface, graffiti interface, and/or any other input device. According to various embodiments described herein, the event occurrences represent one or more selections made by the user via the keypad/entry 250 component, such as the selection of a hard key or a soft key via a touch screen interface. It is appreciated that the aforementioned features of an MCD 102 are provided for illustrative purposes and are not intended to be limiting.

With continued reference to FIG. 1, multiple remote servers 110a-110n may also be provided, which are operable to facilitate communications and other operations of respective MCD applications. Each remote server 110a-110n may be associated with a respective MCD application that may be stored on and operated by an MCD 102. Each remote server 110a-110n may be in communication with the Internet 106, allowing access to and/or data synchronization with the back-end operations of respective MCD applications. For example, an MCD application may be a mobile application executable by an MCD 102 to provide access to a web-based application having back-end operations hosted by or otherwise facilitated by the operation of a respective remote server 110a-110n. Thus, access to a web-based application associated with an MCD application may be provided by way of its associated remote server 110a-110n. Each remote server 110a-110n may be any suitable processor-driven computing device operable for network communications and configured to facilitate data synchronization with MCDs 102.

The system 100 may also optionally include one or more computers 108, which are operable for direct wired and/or wireless communications with an MCD 102 and/or for communications with the Internet 106 (or any other public or private network, which may be wired or wireless). According to one embodiment, the one or more computers 108 may be utilized to facilitate configuration of automatic synchronization functionality, such as to facilitate defining synchronization mappings between MCD event occurrences and MCD applications and/or defining synchronization parameters (e.g., user preferences, usernames, passwords, account information, etc.). In addition, according to one embodiment, data synchronization may occur between an MCD 102 and a computer 108. Accordingly, each computer 108 may be any suitable processor-driven computing device operable for receiving user input, as well as for network communications and/or direct communications with an MCD 102.

Each of the aforementioned systems or system components are configured for accessing and reading associated computer-readable media having data stored thereon and/or computer-executable instructions for implementing the various methods described herein. By executing computer-executable instructions, each of these computer systems may form a special purpose computer or a particular machine. As used herein, the term "computer-readable medium" may describe any form of computer memory or memory device.

Due to network connectivity, various methodologies described herein may be practiced in the context of distributed computing environments. Although the system 100 is shown for simplicity as including one intervening wireless network 104 and Internet 106, it is to be understood that any other network configuration is possible, which may optionally include a plurality of networks, each with devices such as gateways and routers, for providing connectivity between or among networks.

The system 100 shown in and described with respect to FIGS. 1-2 is provided by way of example only. Numerous other operating environments, system architectures, and device configurations are possible. Accordingly, embodiments of the invention should not be construed as being limited to any particular operating environment, system architecture, or device configuration.

Operational Overview

FIGS. 3A-3D are block diagrams representing different example configurations for automatically synchronizing data with a mobile communications device, according to example embodiments of the invention. FIGS. 3A-3D illustrate a different logical operation of automatic synchronization as performed by an MCD 102. These operations include an input or other event occurrence 305, at least one broadcast module 282, synchronization mapping and parameter data 310, at least one listener module 284, multiple MCD applications 275a-275n, and at least one I/O controller 240 to cause transmission and/or reception of MCD application data being synchronized. The block diagrams of FIGS. 3A-3D illustrate a configuration for the detection of a single input or other event occurrence; however, it is to be appreciated that the same or similar configurations can be replicated to detect multiple different event occurrences that cause automatic synchronization of different MCD applications 275a-275n in response thereto.

Figure 3A:
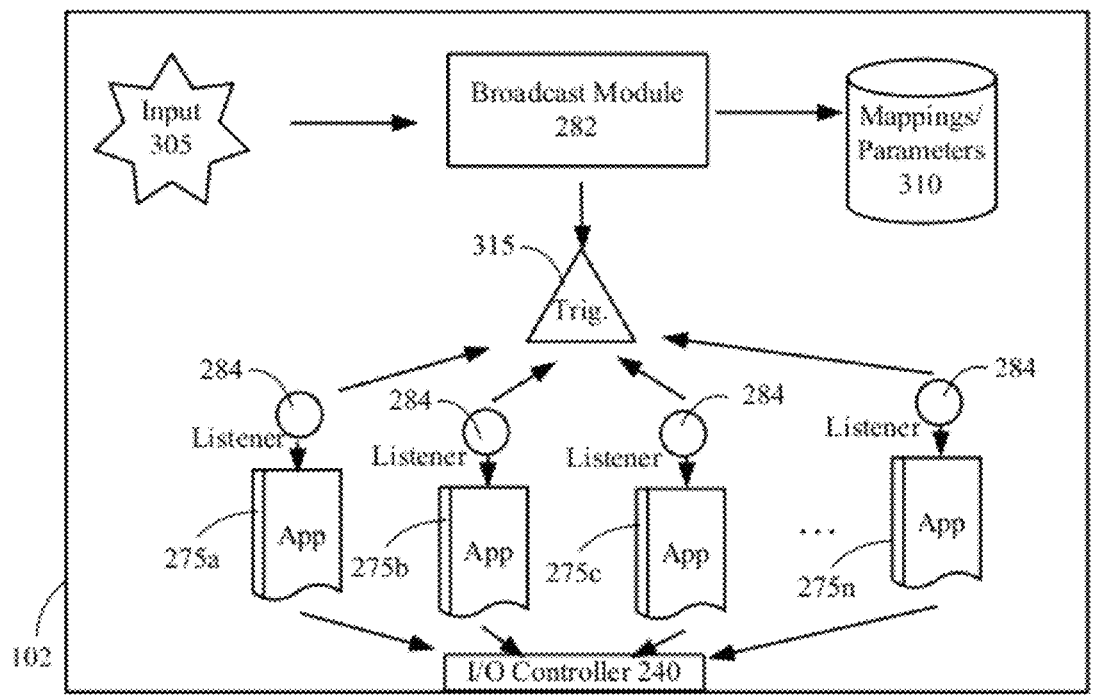
FIGS. 3A-3D are block diagrams representing example configurations for automatically synchronizing data with a mobile communications device, according to example embodiments of the invention.

With reference to FIG. 3A, a first embodiment is shown having a single broadcast module 282 configured to generate a single trigger 315 upon the detection of a particular event occurrence 305, such as, but not limited to, user selection of a hard key or soft key, a predetermined function or application being invoked, or receipt of a predetermined message type and/or message having predetermined content. The broadcast module 282 (or other programming logic, such as the automatic synchronization module 280) generates a single trigger event 315, which is to be detected by multiple listener modules 284, each associated with a different MCD application 275a-275n. According to one embodiment, the broadcast module 282 may be preprogrammed and preconfigured to identify which listener modules 284 and/or which MCD applications 275a-275n are to be invoked for data synchronization based on previously defined synchronization mappings and parameters data 310, such as may be provided by an MCD user during configuration or by a service provider offering the automatic synchronization functionality for the MCD 102. According to another embodiment, the broadcast module 282 may be programmed for more dynamic operation, such as to access the synchronization mappings and parameters data 310 upon detecting an event occurrence 305 to determine which MCD applications 275a-275n are to be synchronized, and thus which listener modules 284 and/or MCD applications 275a-275n the broadcast trigger event 315 is to invoke.

Figure 3B:
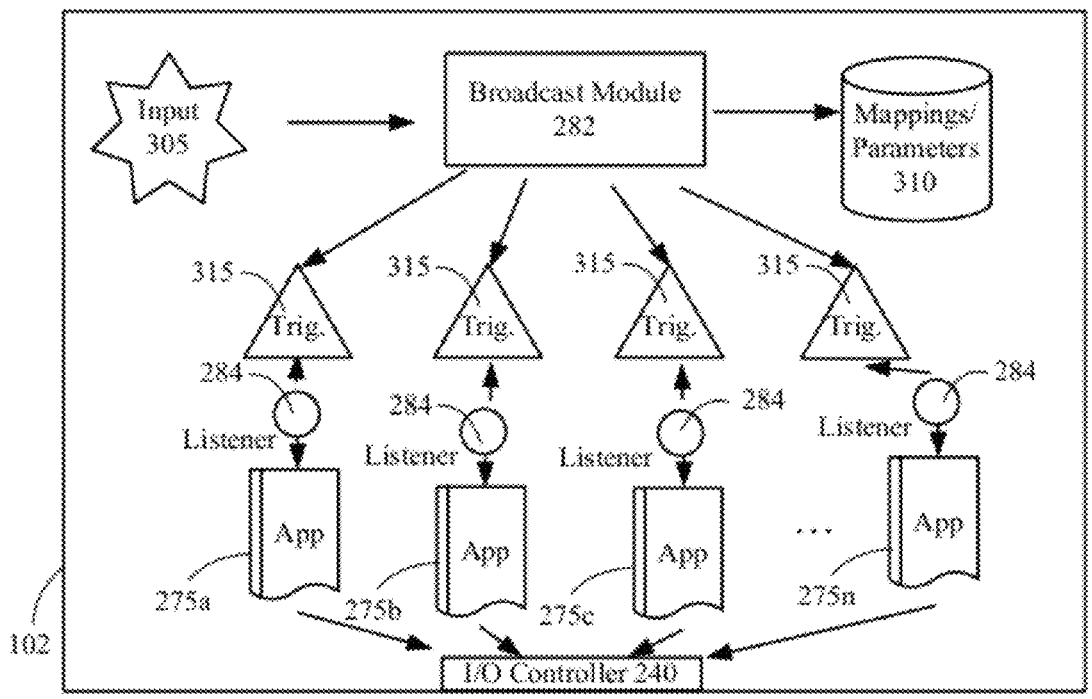

FIG. 3B illustrates a second embodiment, in which a broadcast module 282 is configured to generate multiple broadcast triggers 315 upon the detection of a particular event occurrence 305. Each broadcast trigger 315 is directed to a particular one of multiple MCD applications 275a-275n to be synchronized, and the respective listener modules 284 are each associated with a different one of the MCD applications 275a-275n. According to this embodiment, the broadcast triggers 315 may include application-specific data or commands because of the one-to-one association with each trigger 315 and a unique MCD application 275a-275n. According to one variation of this embodiment, multiple broadcast modules 282 may be provided such that a one-to-one association is provided between the broadcast modules 282 and the listener modules 284.

Figure 3C:
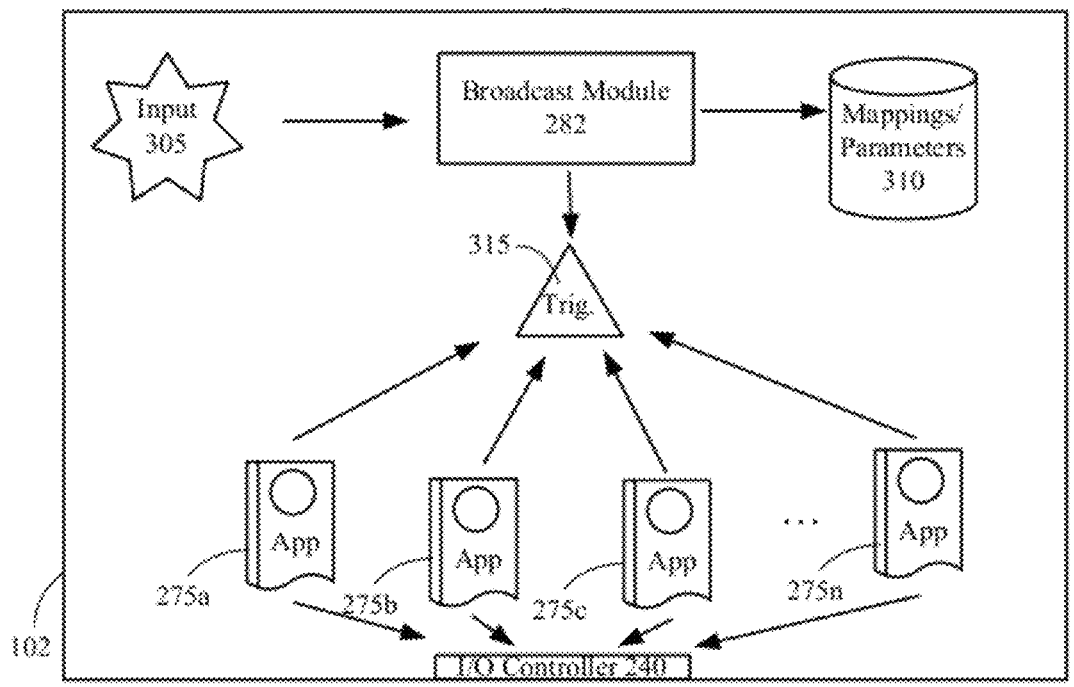

FIG. 3C likewise illustrates a third embodiment, in which a broadcast module 282 is configured to generate a single broadcast trigger 315 upon the detection of a particular event occurrence 305, and the broadcast trigger 315 is detected directly by each of multiple MCD applications 275a-275n to cause synchronization. According to this embodiment, programming associated with each MCD application 275a-275n can be modified directly to detect or otherwise be called by the broadcast trigger 315, instead of providing separate listener modules, as in the previous embodiments. It should be appreciated that any variations described in other configurations described herein may likewise apply to this third embodiment. For example, multiple broadcast triggers 315 may be generated, each related to a specific MCD application 275a-275n, and/or multiple broadcast modules 282 may be provided, each related to a specific MCD application 275a-275n to be synchronized.

Figure 3D:
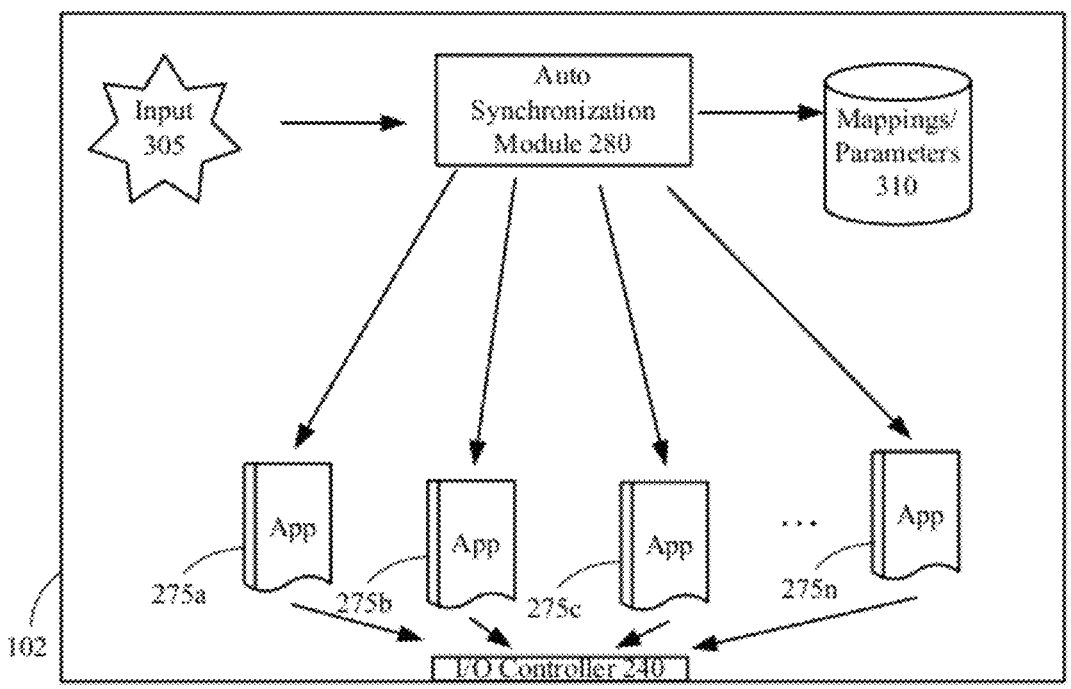

FIG. 3D illustrates a fourth embodiment, in which the MCD 102 includes an automatic synchronization module 280 that facilitates synchronization with one or more MCD applications 275a-275n, optionally without the use of a broadcast module or listener module. This example embodiment is provided to show that other programming logic may be provided to detect event occurrences and initiate data synchronization operations by MCD applications 275a-275n in response thereto. The programming logic need not be provided as separate, independent modules working together and calling or responding to each other, but may be provided as a more complete module performing detection operations and issuing automatic synchronization commands that are otherwise described as being performed by the broadcast modules and/or listener modules.

Figure 4:
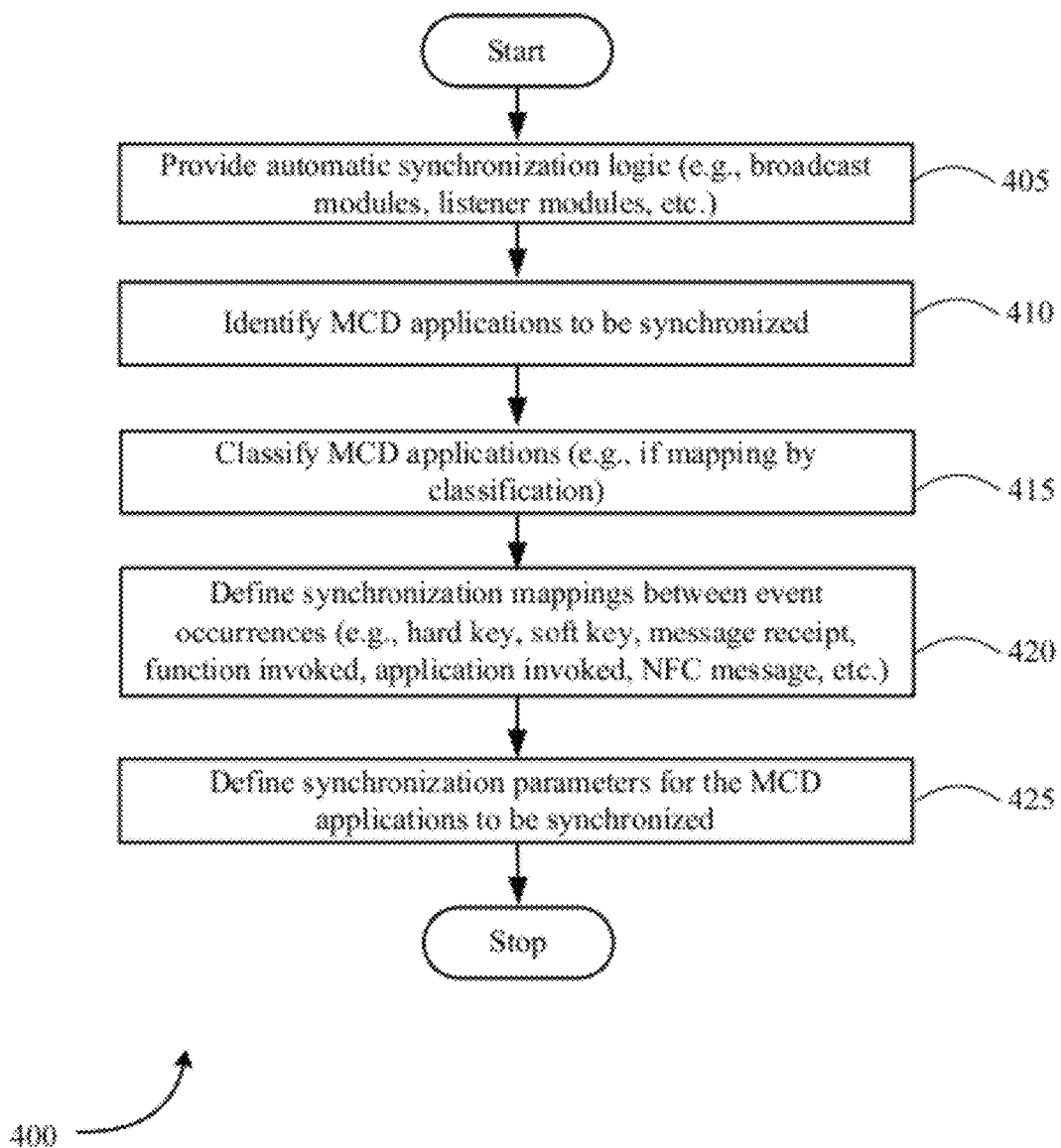
FIG. 4 is a flow diagram of an example method for configuring synchronization operations, according to an example embodiment of the invention.

FIG. 4 is a flow diagram of an example method for configuring synchronization operations, according to an example embodiment of the invention. According to one embodiment, the method 400 may be performed, at least in part, using an MCD, such as the MCD 102 described with reference to FIGS. 1-2, which may include programming logic to allow user configuration of automatic synchronization settings and mappings between event occurrences (e.g., user input, etc.) and the MCD applications to be automatically synchronized. Configuration data, such as MCD application information, event occurrence selections, synchronization mappings, and synchronization parameters can be stored in the memory of the MCD 102 for subsequent recall and execution during automatic synchronization operations as described with reference to FIG. 5. In other embodiments, one or more of the operations described with reference to FIG. 4 may be performed using a system other than (and optionally with) the MCD 102, such as by a user utilizing a computer in communication with the MCD 102, such as the computer 108 described with reference to FIG. 1, or by a provider providing the automatic synchronization functionality and applications for the MCD 102.

The method 400 may begin at block 405, in which automatic synchronization logic is provided for the MCD, such as the automatic synchronization module 280, broadcast module(s) 282, and listener module(s) 284 described in detail with reference to FIGS. 1-3D. These modules and associated logic may be utilized together to perform an automatic synchronization command or operation upon the detection of an event occurrence, as further described with reference to FIG. 5.

At block 410, each of the MCD applications to be synchronized are identified. Any number of user interfaces may be provided to allow displaying available MCD applications and selecting or otherwise designating or inputting an identifier for the MCD applications to be synchronized.

At block 415, one or more of the MCD applications to be synchronized can be classified according to its functionality, purpose, industry, or other classifying factor. MCD application classifications can be utilized to allow automatically synchronizing all MCD applications having the same or similar classifications in response to the same event occurrence, which simplifies the configuration effort required of the user, if at all. Accordingly, synchronization mappings can be configured to allow manually defining associations between an event occurrence and one or more MCD applications, and/or to allow defining associations between an event occurrence and one or more MCD application classifications. It is appreciated that, according to various embodiments, MCD application classifications can be defined in a number of ways, including, but not limited to, by a user by associating various MCD applications with the MCD application classifications or by a provider by providing predefined MCD application classifications and associations with known MCD applications. Example MCD application classifications may include, but are not limited to: social networks, location-based, music, media, photographs, videos, contacts, calendar, retail, information, user status, device status, and the like.

At block 420, synchronization mappings are defined between one or more event occurrences and one or more MCD applications that are to be synchronized in response to the one or more event occurrences. An event occurrence may generally refer to any event or activity performed with or by an MCD, such as, but not limited to, user selection of a hard key (e.g., 0-9, A-Z, camera button, other function button, etc.), user selection of a soft key (e.g., any selection programmable via user interface, such as a touch screen or a menu option, etc.), upon a predetermined function being invoked (e.g., upon invoking a camera, accessing stored contacts, accessing a calendar, powering on/off, etc.); upon a predetermined application being invoked (e.g., upon invoking a media player application, upon invoking a mapping or other location-based application, etc.), upon receipt of a predetermined message type (e.g., upon receipt of an SMS message, an MMS, etc.), upon receipt of a message having predetermined content (e.g., predetermined word or words in the subject line and/or body, predetermined sender, etc.); upon receipt of an NFC message (e.g., containing product information, location-based information, etc.); and the like. It is appreciated that the aforementioned example event occurrences are provided for illustrative purposes only and are not limiting. Any event, input, function, action, message, etc. can be defined as an event occurrence and mapped to one or more MCD applications to be synchronized.

According to various embodiments, an event occurrence may be mapped to a single MCD application for automatic synchronization, or to multiple MCD applications for automatic synchronization with each of the multiple MCD applications upon the occurrence of the same event occurrence. Similarly, multiple event occurrences can be mapped to the same MCD application, such that more than one event occurrence will cause the same MCD application to synchronize.

According to one embodiment, synchronization mappings may be defined directly between an event occurrence and one or more MCD applications. This mapping may be performed by an MCD user. For example, a user may provide synchronization mappings through a configuration interface on the MCD or through remote configuration interfaces, such as over the Internet or via a computer system, which can be subsequently synchronized to the MCD. As another example, an MCD application provider and/or a provider providing the automatic synchronization functionality may provide some of the synchronization mappings. For example, default synchronization mappings can be provided between certain known or popular MCD applications and likely event occurrences. It is appreciated that, according to some embodiments, the synchronization mappings may be altered at any time by an MCD user.

According to another embodiment, synchronization mappings may be defined based on an MCD application classification, whereby an event occurrence is associated with one or more MCD application classifications and MCD applications to be synchronized also have a defined MCD application classification. Thus, by associating event occurrences with MCD application classifications, multiple MCD applications having the same MCD application classification can be automatically synchronized without requiring the MCD user to individually define the synchronization mappings for each MCD application.

Following block 420 is block 425, in which synchronization parameters are defined for the MCD applications to be synchronized. Synchronization parameters may generally include any synchronization configuration setting, synchronization preferences, identification of data and/or data locations, identification of parameters utilized during synchronization, and the like. Synchronization parameters may be defined in a number of ways, including, but not limited to, by an MCD user, by an MCD application provider, and/or by a provider providing automatic synchronization functionality. Example synchronization parameters may include, but are not limited to: usernames; passwords; account identifiers; synchronization frequency (e.g., once per day, every time, 12 hours, 24 hours, etc.); what to synchronize (e.g., all data, only new data, personal data, not private data, file size limitations, number of photos, synchronize only to specific users, block synchronization to specific users, only outbound synchronization, only inbound synchronization, both inbound/outbound synchronization, no location-based information, etc.); data locations (e.g., memory location or file structure within MCD, etc.); automatic synchronization with or without confirmation requests (e.g., requiring MCD user to confirm prior to synchronization); and the like. It is appreciated that the aforementioned example synchronization parameters are provided for illustrative purposes only and are not limiting.

In one embodiment, at least some of the operations performed at blocks 410-425 may be performed automatically by executing programming logic from use of the MCD. For example, automatic synchronization logic may be executed that identifies the MCD applications installed on the MCD, such as by accessing a registry or other stored identification of MCD applications, and automatically associates each, or at least a subset, of the identified MCD applications with one or more event occurrences. Automatic synchronization mapping may be performed based on MCD application classification and/or by default synchronization mappings defined between typical event occurrences and known or popular MCD applications. In some embodiments, the automatic associations may be presented to the MCD user for acceptance or alteration during or after performing the automatic synchronization mapping.

The method 400 may end after block 425, having configured automatic synchronization for an MCD.

Figure 5:
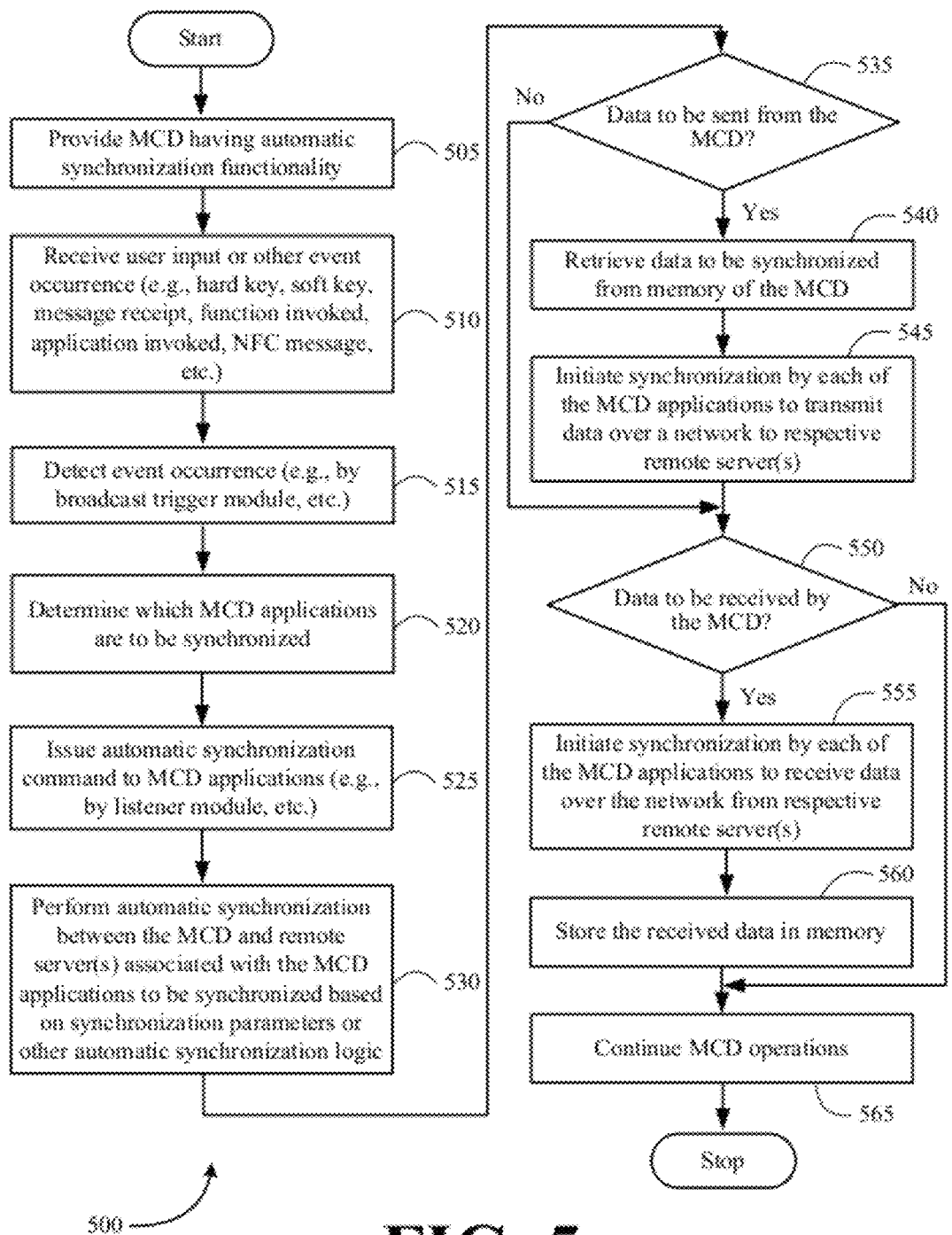
FIG. 5 is a flow diagram of an example method for automatically synchronizing data with a mobile communications device, according to an example embodiment of the invention.

FIG. 5 is a flow diagram of an example method for automatically synchronizing data with an MCD, according to an example embodiment of the invention. The method 500 may be performed, at least in part, by an MCD and associated automatic synchronization programming logic, such as the MCD 102 and the automatic synchronization module 280, the broadcast module(s) 282, and the listener module(s) 284 described with reference to FIGS. 1-3D.

The method 500 may begin at block 505, in which an MCD is provided that has automatic synchronization functionality and is configured to perform as described by the method 400 of FIG. 4.

At block 510, an event occurrence is performed by the MCD. As described, the event occurrence may be any user input (e.g., hard key, soft key, etc.), a predetermined function or application that is invoked, receipt of a predetermined message, and the like. At block 515, the event occurrence is detected if the event occurrence is one which is associated with one or more MCD applications to be synchronized, as defined by the synchronization mappings. For example, a broadcast module 282 may be configured to detect the event occurrence, as described in detail with reference to FIGS. 3A-3D.

Following block 515 is block 520, in which it is determined which MCD application or applications are to be synchronized. As further described with reference to FIGS. 3A-3D, a number of techniques may be utilized to identify the MCD applications to be synchronized upon the detection of a certain event occurrence. For example, synchronization mappings can be accessed to determine which MCD applications are to be automatically synchronized for the event occurrence detected, either directly or based on MCD application classification associations. In other embodiments, the programming logic configured to detect the event occurrence, such as the broadcast module 282, may include an indication of each of the MCD applications and/or the MCD application classifications to be automatically synchronized. According to yet another embodiment, the broadcast modules 282 may be more general, while the listener modules 284 may be configured to detect a broadcast trigger event or events generated in response to a specific event occurrence or occurrences for the MCD applications to which the listener modules 284 are associated. In this embodiment, a broadcast module 282 may generate a broadcast trigger event that provides a URI, which is configured to indicate the event occurrence detected (e.g., "camera://pressed," etc.) and/or the MCD application or applications or MCD application classifications to be synchronized.

Following block 520 is block 525, in which an automatic synchronization command is issued to the MCD application or applications to be automatically synchronized based on the detection of the event occurrence. For example, as described with reference to FIGS. 3A-3D, a listener module or modules 284, or other programming logic, may be configured to invoke the synchronization function of the MCD application or applications to be synchronized. It is appreciated that a number of techniques may be utilized to invoke the data synchronization function for each MCD application, which may depend, at least in part, on the type of the MCD application, the configuration and/or programming of the MCD application, and/or the configuration of the automatic synchronization logic executed by the MCD. For example, in one embodiment, an MCD application may have an open interface or routine (e.g., a standard API, etc.) that can be called by the listener modules 284 or other programming logic.

At blocks 530-560, automatic synchronization of data is performed over a network between the MCD and one or more remote servers associated with the MCD applications being synchronized, such as between the wireless network 104 and the remote servers 110a-110n described with reference to FIG. 1. At block 530, automatic synchronization parameters and/or other automatic synchronization logic is analyzed to facilitate the automatic synchronization. Parameters may be associated with each of the MCD applications being synchronized, such as the parameters and other data conventionally utilized during synchronization. Synchronization parameters may also include those defined during the operations described with reference to block 425 of FIG. 4. Synchronization parameters may be provided according to a variety of techniques, including, but not limited to, by a broadcast module 282, by a listener module 284, and/or by accessing synchronization parameters stored in memory.

At decision block 535, it is determined whether the automatic synchronization operations are to include outbound synchronization, transmitting data from the MCD to the one or more remote servers. If so, then blocks 540-545 are performed. At block 540, the data to be synchronized for each MCD application is retrieved from the memory of the MCD. As described, the MCD application configuration and/or synchronization parameters may define which data is to be synchronized and/or where the data is to be stored. At block 545, synchronization is performed to transmit the data over the wireless network to the respective remote servers. Synchronization over the wireless network (or any other network) may be performed according to the conventional synchronization techniques and protocol utilized for the MCD, the MCD application, and the wireless carrier network. For example, according to one embodiment, synchronization may include wireless application protocol ("WAP") utilizing messaging files configured as wireless mark-up language ("WML") files and communicating according to Simple Object Access Protocol ("SOAP") standards. For example, data to be transmitted may be compiled into one or more WML files, having a format and/or content that can be determined by the intended remote server recipient. The MCD application or other programming logic can initiate a hypertext transfer protocol ("HTTP") session (e.g., via a WAP module provided by the MCD) to transmit the data from the MCD to the remote server as a WAP push message. It is appreciated that any other suitable wireless synchronization techniques and protocol may be utilized, such as, but not limited to: Microsoft Corporation's ActiveSync or Exchange ActiveSync protocol, Apple Inc.'s iOS Sync, or Google Inc.'s Android operating system synchronization protocol, as desired. Moreover, data need not be transmitted as WML files, but can be transmitted as any other type of file, such as, but not limited to: text files, comma separated files, extensible mark-up ("XML") files, MMS messages, emails, and the like.

According to one embodiment, prior to performing the synchronization operations at block 545 (or at any other point in the method 500), the MCD may present the user with a request for confirmation prior to synchronization. This confirmation may be generated and presented locally by the MCD or, in part, received over the network, such as from a wireless carrier or from a remote server. Express user confirmation may be desired in circumstances when data transfer is to be monitored.

If, at decision block 535, it is determined that synchronization is not to be transmitted outbound from the MCD, or after performing outbound synchronization at block 545, decision block 550 follows. At decision block 550, it is determined whether the automatic synchronization operations are to include inbound synchronization, receiving data at the MCD from the one or more remote servers associated with the MCD applications. If so, then operations continue to blocks 555-560, in which inbound synchronization operations are performed by the respective MCD applications being performed, and the data received is stored in the memory of the MCD, respectively. Express confirmation may be requested from the MCD user prior to inbound synchronization, in one embodiment, similar to that described above with reference to outbound synchronization.

Following block 560, or at decision block 550, if automatic synchronization is not to include inbound synchronization, then MCD operations are continued at block 565.

Accordingly, the method 500 may end after block 565, having automatically detected an event occurrence and, in response, performed automatic synchronization (inbound and/or outbound synchronization) by one or more MCD applications between the MCD and the remote servers associated with the MCD application(s). Thus, automatic synchronization can be performed in the background during the user's normal operation of the MCD, without requiring explicit instructions from the user to synchronize or even access the MCD application.

The following table provides a list of example synchronization activities that may be performed for example MCD applications, based on the detection of sample event occurrences.

TABLE 1

| Event Occurrence | MCD Application Classification | MCD Application | Outbound Synchronization | Inbound Synchronization |
|---|---|---|---|---|
| Volume up/down | Media; music | Digital music stores; digital media stores; streaming media sites; file-sharing sites; media library (e.g., Apple Inc.'s iTunes, etc.) | Recent playlist; recent purchases; recent downloads | Metadata associated with played media; media recommendations; new media available; new media not on MCD |
| Camera key; camera function | Photographs | Social network sites; photo storing/hosting sites; media library; informational sites; text-based informational sites; photo-based informational sites | New photographs on MCD | New photographs not on MCD; recent photo posts from friends/users of social network sites; information determined relevant to photograph (e.g., product information, location information, facts, etc.) |
| Video camera key; video camera function | Videos | Social network sites; video sharing sites; media library | New videos on MCD | New videos not on MCD; recent video posts from friends/users of social network sites |
| Power on/off key | Status updates | Wireless carrier back-end; social network sites | Status (online or away from device, etc.) | Updated account status (e.g., minutes usage, data usage, etc.); software synchronization |
| Five-way navigation keys (e.g., left, right, up, down, OK) | Any | Any | Any | Any |

TABLE 1-continued

| Event Occurrence | MCD Application Classification | MCD Application | Outbound Synchronization | Inbound Synchronization |
|---|---|---|---|---|
| Hard or soft keys assigned as favorites or shortcuts | Any | Any | Any | Any |
| QWERTY hard or soft keys assigned as favorites or shortcuts | Any | Any | Any | Any |
| Number hard or soft keys assigned as favorites | Any | Any | Any | Any |
| Any menu option | Any | Any | Any | Any |
| NFC message | Location-based; product information | Social network sites; mapping sites; product information sites; retail sites | Current location (geographical, retail location, etc.); update a favorites list (e.g., at a retail site, etc.) | Product information; location information; new media; top ten lists; metadata associated with product/media |
| Contacts function or contact-based application | Contacts | Email; contact management application | New contacts on MCD; updated contact information on MCD | Contacts not on MCD; updated contact information not on MCD |
| Calendar function | Scheduling | Social network sites; email; scheduler application | Updated schedule information | Schedule information not on MCD |
| SMS message sent/received, MMS message sent/received, email sent/received | Social network; contacts | Social network sites; contact management; email | Friend request to new message sender/recipient; add new contact information | Receive new posts by sender/recipient |
| Any | Social network | Social network sites | Location; status; new photos on MCD; new videos on MCD; new posts by MCD user; profile changes | New posts by friends; new photos by friends; new videos by friends; new comments by friends; messages |
| Any | Media | File-sharing sites; digital music stores; streaming media sites | Recent played media; updated favorites list | Metadata associated with played media; media recommendations; new media available |
| Any | Location-based | Wireless carrier back-end | Current location data (e.g., GPS coordinates or NFC location identifier, etc.) | Updated wireless network roaming profile or other settings |

It is appreciated that the aforementioned list is provided for illustrative purposes and is not limiting. Any event occurrence and MCD application combination may be defined by the synchronization mappings and any suitable data may be automatically synchronized.

Various block and/or flow diagrams of systems, methods, apparatus, and/or computer program products according to example embodiments are described above. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments.

These computer-executable program instructions may be loaded onto a special purpose computer or other particular machine, a processor, or other programmable data processing apparatus to produce a particular machine, such that the instructions that are executed on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that are executed on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

Many modifications and other embodiments of the invention set forth herein will be apparent having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for automatically synchronizing data with a mobile communications device, comprising:
   identifying, by one or more processors, a plurality of mobile communications device (MCD) applications to be synchronized;
   associating, by the one or more processors, an automatic synchronization command with an event occurrence on a MCD and the plurality of MCD applications;
   generating, by the one or more processors, a broadcast trigger in response to detecting the event occurrence;
   transmitting, by the one or more processors, the broadcast trigger to one or more listener modules associated with the plurality of MCD applications;
   in response to detecting the broadcast trigger, determining, based at least in part on an MCD classification associated with at least one MCD application of the plurality of MCD applications, to execute the automatic synchronization command; and
   executing the automatic synchronization command to cause automatic synchronization of data between a memory of the MCD and a plurality of remote servers for the at least one MCD application of the plurality of MCD applications, wherein the at least one MCD application of the plurality of MCD applications is associated with a respective remote server of the plurality of remote servers.

2. The method of claim 1, wherein the event occurrence comprises one of: (a) an MCD hard key selection; (b) an MCD soft key selection; (c) invoking a predetermined function by the MCD; (d) invoking a predetermined application by the MCD; (e) receipt of a message by the MCD; or (f) receiving a near field communications (NFC) message by the MCD.

3. The method of claim 1, wherein the automatic synchronization command is associated with at least one MCD application by association with at least one MCD application classification, wherein the at least one MCD application is associated with the same MCD application classification.

4. The method of claim 3, wherein the at least one MCD application comprises a plurality of MCD applications, each associated with the same MCD application classification and, wherein, upon detecting the event occurrence, execution of the automatic synchronization command causes automatic synchronization of the data between the memory of the MCD and the at least one remote server associated with the plurality of MCD applications.

5. The method of claim 1, wherein the automatic synchronization comprises transmitting data stored in the memory of the MCD to the at least one remote server associated with the at least one MCD application.

6. The method of claim 1, wherein the automatic synchronization comprises the MCD receiving data from the at least one remote server associated with the at least one MCD application for storage in the memory of the MCD.

7. The method of claim 1, wherein the automatic synchronization is performed over a wireless network.

8. The method of claim 1, wherein the automatic synchronization command comprises a broadcast trigger, and further comprising:
   detecting the execution of the broadcast trigger by at least one listener module associated with at least one MCD application; and
   automatically issuing a synchronization operation by the at least one MCD upon detection of the broadcast trigger by the at least one listener module.

9. The method of claim 1, further comprising, upon the detection of the event occurrence, retrieving data from the memory of the MCD for automatic synchronization from the memory of the MCD to the at least one remote server associated with the at least one MCD application.

10. The method of claim 9, wherein at least a portion of the data retrieved is associated with the event occurrence.

11. The method of claim 9, wherein at least a portion of the data retrieved is generated as a result of the event occurrence.

12. The method of claim 1, wherein the association of the automatic synchronization command with the event occurrence and the at least one MCD application is at least partially configurable by a user of the MCD.

13. The method of claim 1, wherein the automatic synchronization command further includes synchronization parameters effecting the automatic synchronization of the data, wherein at least a portion of the synchronization parameters is configurable by a user of the MCD.

14. A non-transitory computer-readable media comprising computer program instructions which when executed by at least one mobile communications device (MCD) processor causes the at least one MCD processor to:
   identify a plurality of mobile communications device (MCD) applications to be synchronized;
   associate an automatic synchronization command with an event occurrence on an MCD and the plurality of MCD applications;
   generate a broadcast trigger in response to detecting the event occurrence;
   transmit the broadcast trigger to one or more listener modules associated with the plurality of MCD applications;

in response to detecting the broadcast trigger, determining, based at least in part on an MCD classification associated with at least one MCD application of the plurality of MCD applications, to execute the automatic synchronization command; and execute the automatic synchronization command to cause automatic synchronization of data a between a memory of the MCD and a plurality of remote servers for the at least one MCD application of the plurality of MCD applications, wherein the at least one MCD application of the plurality of MCD applications is associated with a respective remote server of the plurality of remote servers.

15. The computer-readable media of claim 14, wherein the computer program instructions further comprise at least one broadcast trigger module which when executed by at least one MCD processor causes the at least one MCD processor to detect the event occurrence and to generate at least one broadcast trigger in response thereto.

16. The computer-readable media of claim 15, wherein the computer program instructions further comprise at least one listener module associated with the at least one MCD application which when executed by at least one MCD processor causes the at least one MCD processor to detect the at least one broadcast trigger and to issue a synchronization operation by the at least one MCD in response thereto.

17. The computer-readable media of claim 16, wherein the at least one MCD application comprises a plurality of MCD applications, and wherein the at least one listener module comprises a plurality of listener modules, each listener module associated with a respective one of the plurality of MCD applications.

18. The computer-readable media of claim 16, wherein the at least one MCD application comprises a plurality of MCD applications, and wherein the at least one listener module comprises one listener module associated with the plurality of MCD applications.

19. The computer-readable media of claim 15, wherein the automatic synchronization command is configured to detect a plurality of event occurrences, and wherein the at least one broadcast trigger comprises a plurality of broadcast triggers, each associated with a respective one of the plurality of event occurrences.

\* \* \* \* \*